No. 660,597. Patented Oct. 30, 1900.
J. F. STEWARD.
HINGE JOINT FOR MOWING MACHINES.
(Application filed Mar. 26, 1900.)
(No Model.)
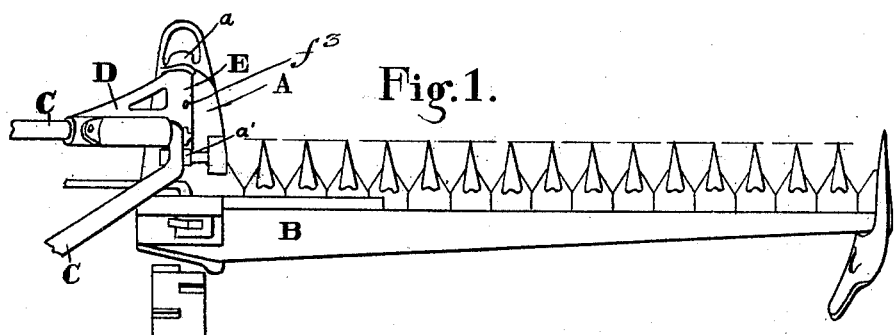
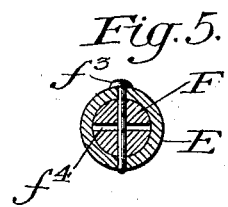
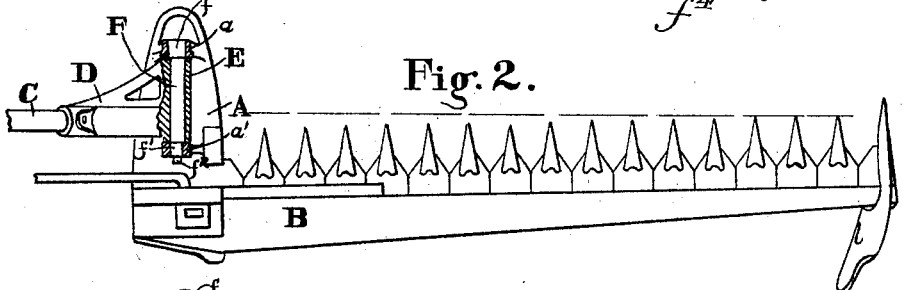
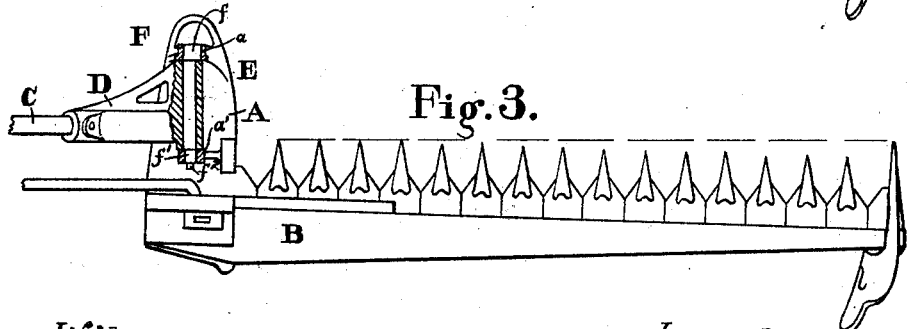
Witnesses:
Wm A. Dreffein.
Marvin Cramer
Inventor:
John F. Steward

UNITED STATES PATENT OFFICE.

JOHN F. STEWARD, OF CHICAGO, ILLINOIS.

HINGE-JOINT FOR MOWING-MACHINES.

SPECIFICATION forming part of Letters Patent No. 660,597, dated October 30, 1900.

Application filed March 26, 1900. Serial No. 10,224. (No model.)

*To all whom it may concern:*

Be it known that I, JOHN F. STEWARD, of Chicago, in the county of Cook and State of Illinois, have invented certain new and useful Improvements in Hinge-Joints for Mowing-Machines, of which the following is a full, description, reference being had to the accompanying drawings, in which—

Figure 1 shows so much of an ordinary mowing-machine as necessary to illustrate the purposes of my invention, and Figs 2, 3, and 4 show the combination or parts constituting it. Fig. 5 is a section through the sleeve and pin.

In that class of mowing-machines in which the cutting apparatus rocks upon an axis transverse to the line of advance of the machine the parts are liable to become bent and the joints worn, so that the grass end of the cutting apparatus sags back more than desirable.

The object of the invention is to make alinement of the cutting apparatus possible at any time.

To this end I make the hinge-pin that connects the shoe A, to which the cutting apparatus B is secured, with what may be considered a double bend, in effect, as shown in Fig. 4.

C is the coupling-frame of a mowing-machine, and D a swivel adapted to be rocked thereon. Through the lugs $a$ and $a'$ of the shoe and through the sleeve E of the swivel the hinge-pin F passes. The forward end $f$ of the pin F is considerably larger than the rear end $f'$. The enlargement $f$ is necessitated by the fact that the greater part of the length of the pin has its axis at an angle relative to the general axis of the pin at its ends. Upon the rear end of the pin the squared extension $f^2$ may be produced for convenience in turning the said pin. When in place, the hinge-pin is secured by a pin or cotter passing through the sleeve of the swivel. In Fig. 1 the cutting apparatus is shown in its proper position. If the bars C C yield and allow the cutting apparatus to sag back at its outer end, it may be moved forward by turning the pin in the swivel, as shown in Fig. 2. In order that this matter may be clearly understood, the two extremes are shown in Figs. 2 and 3. In the former the pin is in a position to hold the grass end of the cutting apparatus well forward. Fig. 3 shows the cutting apparatus in some position it may have acquired in work. Two holes $f^4$ in the pin F cross each other, as shown in Fig. 4. Through one of these the cotter or pin $f^3$ may be put, and thus the said pin F be held in any position to which it may be turned. By removing this pin $f^3$ and applying the wrench to the squared portion $f^2$ the pin can be turned and the cutting apparatus adjusted at will. The cotter or pin $f^3$ may then be replaced and the parts held in position.

I have shown the swivel D as one piece formed of two sleeves, one of them passing upon the coupling-frame; but it is plain that it may be secured to the coupling-frame in any well-known manner.

What I claim as my invention, and desire to secure by Letters Patent, is—

1. In a mowing-machine the coupling-frame, a swivel pivoted thereon, a shoe pivoted to said swivel by means of a pin having the axis of the portion within the sleeve of said swivel at an angle relative to the axis of the said pin in the said shoe, all combined substantially as described.

2. In a mowing-machine a coupling-frame, a finger-bar pivoted to said coupling-frame by means of a pin having the portion which has its bearing connected with the bar at an angle to the portion which has its bearing connected with the coupling-frame, all combined substantially as described.

JOHN F. STEWARD.

Witnesses:
WM. A. DREFFEIN,
MARVIN CRAMER.